United States Patent [19]

Hashimoto

[11] Patent Number: 4,810,011

[45] Date of Patent: Mar. 7, 1989

[54] STRUCTURE IN WHICH A SMALL-DIAMETER THIN METAL TUBE IS FIXED AT ONE END TO A FLANGE COUPLING

[75] Inventor: Yasuaki Hashimoto, Tagata, Japan

[73] Assignee: Usui Kokusai Sangyo Kabushiki Kaisha, Shizuoka, Japan

[21] Appl. No.: 147,175

[22] Filed: Jan. 22, 1988

[51] Int. Cl.$^4$ ............................................. F16L 13/04
[52] U.S. Cl. ..................................... 285/116; 285/416
[58] Field of Search ................ 285/416, 405, 115, 116

[56] References Cited

U.S. PATENT DOCUMENTS

| | | | |
|---|---|---|---|
| 431,816 | 7/1890 | Lomasney | 285/405 X |
| 1,554,881 | 9/1925 | Reimann | 285/416 X |
| 2,669,467 | 2/1954 | Wolferz | 285/416 |
| 3,909,049 | 9/1975 | Blatnica | 285/416 X |
| 4,336,958 | 6/1982 | Goetzinger | 285/416 X |
| 4,484,771 | 11/1984 | Schulz | 285/416 X |

FOREIGN PATENT DOCUMENTS 2549282 5/1977 Fed. Rep. of Germany ...... 285/416

Primary Examiner—Thomas F. Callaghan
Attorney, Agent, or Firm—Anthony J. Casella; Gerald E. Hespos

[57] ABSTRACT

A structure in which a small-diameter thin metal pipe is connected at one end to a flange coupling. The pipe has an end portion and an outer turned-up portion formed at the end of the end portion of the pipe. The structure includes a metal sleeve inserted at one end between the end portion and turned-up portion of the pipe. The sleeve is longer than the turned-up portion. The metal sleeve and the end portion and turned-up portion of the pipe as they are inserted into a hole in the flange coupling and fixedly welded together along at least the edge of the hole.

6 Claims, 1 Drawing Sheet

STRUCTURE IN WHICH A SMALL-DIAMETER THIN METAL TUBE IS FIXED AT ONE END TO A FLANGE COUPLING

BACKGROUND OF THE INVENTION

1. Field of the Invention

This invention relates to improvements to a structure in which a pipe having a relatively small diameter and a thin thickness is fixed by welding to a flange coupling. More particularly, the pipe has a diameter less than about 20 mm and a thickness less than about 1.5 mm and made of carbon steel or stainless steel and used as a passageway for feeding oil and/or gas to vehicles, other various machines, installations, devices, etc. The flange coupling is provided on the side of the vehicles, or other various machines, etc.

2. Description of the Prior Art

In a conventional structure of this type, as illustrated in FIG. 4, a pipe P' is inserted at its cut end into a hole 12 in a flange 11 of an object and welded at 14 by gas or arc along the edge of the hole.

However, this method creates a thinned portion 15 on the pipe P', as shown in FIG. 5, due to a great difference in thickness between the pipe and the flange and due to local gas or arc welding in heating to thereby reduce the mechanical strength. This results in pipes having unequal bent forms. Irrational connection of a pipe having such a thinned portion under inconvenient and hard conditions would create cracks and breakage in the thinned portion and leakage of oil and/or gas due to possible vibrations applied to such pipe.

SUMMARY OF THE INVENTION

It is an object of this invention to provide a structure in which a small-diameter thin metal tube is fixed to a flange coupling and which is free from the above problems, decreases the degree of crack, breakage and/or leakage in the vicinity of a portion of a pipe which is heated and welded by gas or arc although the pipe is greatly different in thickness from the flange coupling.

Briefly, in a fixing structure according to this invention, a small-diameter thin metal pipe has at one end an outer turned-up cylindrical portion which is received in a hole in a flange. A metal sleeve, longer than the turned-up portion, is inserted at one end between the the turned-up portion and end portion of the pipe and welded to the flange at the peripheral edge of the hole. The metal sleeve has an outer surface tapering toward the other end thereof.

DETAILED DESCRIPTION OF PREFERRED EMBODIMENT

Figure 1:
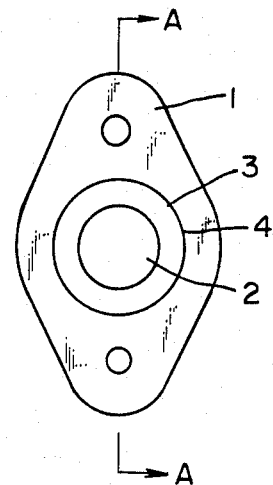
FIG. 1 is a front view of an embodiment of a fixing structure according to this invention in which a small-diameter thin metal pipe is welded at one end to a flange coupling.
Figure 2:
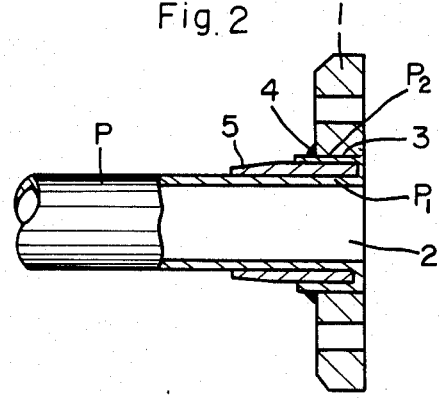
FIG. 2 is a partially cutaway cross-sectional view taken along the line A—A of FIG. 1.
Figure 3:
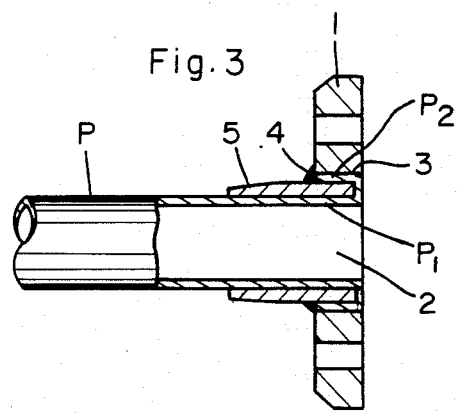
FIG. 3 is a view, similar to, FIG. 2, of another embodiment.
Figure 4:
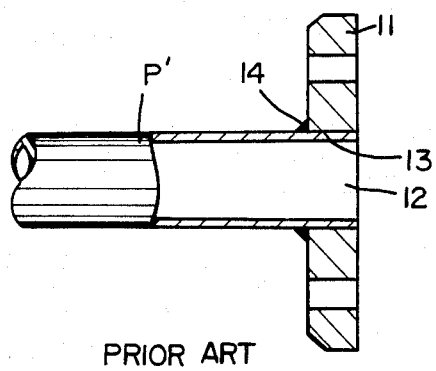
FIG. 4 is a partially cutaway cross-sectional view of a conventional example.
Figure 5:
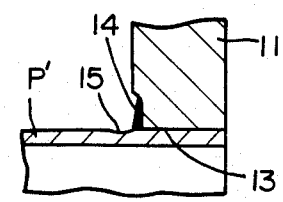
FIG. 5 is a partially enlarged view of a welded portion shown in FIG. 4.

In FIGS. 1-3, a flange 1 is made of carbon steel or stainless steel and has a central assembling hole 2 and fixing holes remote from the central hole used for fixing the flange to an object. A pipe P has a small diameter and thin thickness and is also made of carbon steel or stainless steel as well. It has an end portion P1 and an outer turned-up cylindrical portion P2 which form a U cross section. A metal sleeve 5, longer than the turned-up cylindrical portion of the pipe, is inserted between the end portion P1 and turned-up portion P2 of the pipe. The sleeve and pipe are inserted in their assembled condition into the hole 2 in the flange. The turned-up cylindrical portion P2 of the pipe is fixedly welded to the inner surface of the hole 3 (FIG. 2). Alternatively, the inner hole surface 3, the metal sleeve 5 and the end of the turned-up portion P2 may fixedly be welded together (FIG. 3). It is to be noted that the metal sleeve 5 is made of carbon steel or stainless steel.

As just described above, according to this invention, the metal sleeve 5 is held between the end portion P1 and turned-up portion P2 of the pipe, the metal sleeve 5 and the end portion and turned-up portion of the pipe are inserted in their assembled condition into the hole 2 in the flange 1, the turned-up portion P2 and the inner hole surface 3 or the inner hole surface 3, the turned-up portion P2 end and the metal sleeve 5 are welded at 4. In other words, the sleeve 5 is used as a separate protective wall and the turned-up cylindrical portion P2 is welded to the inner hole surface, so that thinning the pipe due to local heating is decreased or prevented to thereby improve the mechanical strength of the pipe while facilitating the control of the welding operation even if the pipe and flange which differ greatly in thickness are welded by gas or arc.

As described above, the fixing structure according to this invention in which a small-diameter thin metal pipe is welded to the flange coupling improves the mechanical strength in the vicinity of the welded portion of the pipe, so that it reduces or prevents the production of unequal bent pipes, irrational connection of pipes under undesirable, inconvenient hard conditions, and the occurrence of cracks and breakage and leakage in the vicinity of the welded portion of the pipe even if the pipe is used under conditions in which it is subjected to vibrations.

I claim:

1. A fixing structure for connecting a small-diameter thin metal pipe to a flange coupling, said structure comprising:

a flange coupling having a hole extending therethrough;

a pipe having an end portion, an outer turned-up portion spaced radially outwardly from the end portion, and a connecting portion extending integrally therebetween, the turned-up portion of the pipe being mounted in the hole of the flange coupling;

a metal sleeve having first and second opposed ends, the first end of said sleeve being between the end portion and turned-up portion of the pipe, the sleeve being longer than the turned-up portion; and the turned-up portion of the pipe and the flange coupling being fixedly welded together along at least the edge of the hole, and with the second end of said metal sleeve being substantially free of fixed connection to the pipe.

2. A fixing structure according to claim 1, wherein the metal sleeve has an outer surface tapering toward the second end thereof.

3. A fixing structure according to claim 1, wherein the metal sleeve is made of carbon steel or stainless steel.

4. A fixing structure according to claim 1, wherein the pipe is made of carbon steel or stainless steel.

5. A fixing structure according to claim 1, wherein the flange is made of carbon steel or stainless steel.

6. A fixing structure according to claim 1, wherein the turned-up portion of the pipe and the metal sleeve are fixedly welded together.

* * * * *